Patented Nov. 14, 1950

2,529,992

UNITED STATES PATENT OFFICE 2,529,992

PRODUCTION OF N'-p-CHLOROPHENYL-N⁵-ISOPROPYL BIGUANIDE

Leonce Edouard Bessot, Paris, and Pierre Garet, Choisy-le-Roi, France, assignors to Societe des Usines Chimiques Rhone-Poulenc, Paris, France, a French body corporate No Drawing. Application February 14, 1949, Serial No. 76,423. In France February 20, 1948

6 Claims. (Cl. 260—565)

1

This invention relates to the production of $N^1$-p-chlorophenyl-$N^5$-isopropyl biguanide, a valuable anti-malarial drug.

In application Serial No. 76,422 filed on even date herewith a process for the production of a p-chlorophenyl cyanamide salt of isopropylguanidine is described.

The present invention concerns the preparation of $N^1$-p-chlorophenyl-$N^5$-isopropyl biguanide by the isomerisation of this salt. According to the present invention a process for the production of $N^1$-p-chlorophenyl-$N^5$-isopropyl biguanide comprises heating the p-chlorophenyl cyanamide salt of isopropyl guanidine. The salt may be heated either dry or in suspension in a medium which is not a solvent for the salt or for the $N^1$-p-chlorophenyl-$N^5$-isopropyl biguanide produced for a sufficient period to produce isomerisation thereof. However, these methods frequently give rise to the formation of secondary products in considerable quantities.

The isomerisation may also be effected in solution in a common solvent for the salt and for the $N^1$-p-chlorophenyl-$N^5$-isopropyl biguanide or in a solvent for the salt which is not a solvent for the $N^1$-p-chlorophenyl-$N^5$-isopropyl biguanide.

In the preferred form of the invention, however, the isomerisation is effected in a reaction medium which is not a solvent for the salt but which is a solvent for the $N^1$-p-chlorophenyl-$N^5$-isopropyl biguanide. Non-polar solvents of this type such as benzene, toluene and anisole, can be used and it is preferred to employ toluene or other similarly high boiling non-polar solvent at substantially the boiling point of such solvent. By this method the tendency for the production of secondary products of the isomerisation is much reduced.

The invention is illustrated by the following examples, in which the parts are by weight, but these examples are not to be regarded as limiting the invention in any way:

Example I

The crude salt containing 3% water described in Example I of co-pending application Serial No. 76,422 is progressively heated in vacuo to drive off the water at low temperature, and then maintained at 110° C. for 3 hours. The $N^1$-p-chlorophenyl-$N^5$-isopropyl biguanide formed is dissolved in toluene at 60° C., and this solution is washed at about 60 to 85° C. with an aqueous solution of acetic acid, from which the $N^1$-p-chlorophenyl-$N^5$-isopropyl biguanide is separated either by crystallisation in the form of its acetate, or, by dilution in water, cooling and treatment with soda, in the form of the base. The yield is 40% on the starting salt.

Example II 1 part of the crude salt containing 1% water described in Example II of co-pending application Serial No. 76,422 is suspended in 4 parts of toluene, and dehydrated in the hot state by azeotropy. The mixture is then heated for three hours at the boiling point of the toluene. The $N^1$-p-chlorophenyl-$N^5$-isopropyl biguanide thus formed is separated from the toluene solution thus obtained, by either of the procedures described in Example I. The yield is 90% on the starting salt.

Example III

The still liquid crude salt obtained as described in Example I of co-pending application Serial No. 76,422 is run into boiling toluene immediately after the aqueous solution of sodium sulphate has been decanted, the water contained therein is removed by azeotropy, and the mixture is maintained for three hours at 110° C. The $N^1$-p-chlorophenyl-$N^5$-isopropyl biguanide thus formed is separated from the toluene solution, as in the preceding examples. The yield is 75% on the salt contained in the crude liquid starting material.

Example IV 1 part of the crude salt containing 1% of water as described in Example II of co-pending application Serial No. 76,422 is heated with 4 parts of benzene. The water contained therein is first separated by azeotropy, and the mixture is then maintained for fourteen hours at 80° C. The benzene solution obtained is washed with an aqueous solution of acetic acid and the $N^1$-p-chlorophenyl-$N^5$-isopropyl biguanide thus formed is separated from this solution, as described in the previous examples. The yield amounts to 23% on the starting salt.

We claim:

1. Process for the preparation of $N^1$-p-chlorophenyl-$N^5$-isopropyl biguanide which comprises heating the p-chlorophenyl cyanamide salt of isopropyl guanidine at a temperature below the decomposition temperature of the said biguanide.

2. Process for the preparation of $N^1$-p-chlorophenyl-$N^5$-isopropyl biguanide which comprises heating the p-chlorophenyl cyanamide salt of isopropyl guanidine in the dry state at a temperature below the decomposition temperature of the said biguanide.

3. Process for the preparation of $N^1$-p-chlorophenyl-$N^5$-isopropyl biguanide which comprises heating the p-chlorophenyl cyanamide salt of isopropyl guanidine in suspension in an organic liquid which is a non-solvent for the said salt but which is a solvent for the said $N^1$-p-chlorophenyl-$N^5$-isopropyl biguanide at a temperature below the decomposition temperature of the said biguanide.

4. Process for the preparation of $N^1$-p-chlorophenyl-$N^5$-isopropyl biguanide which comprises heating the p-chlorophenyl-cyanamide salt of isopropyl guanidine in suspension in a non-polar organic liquid which is a non-solvent for the said salt but which is a solvent for the said $N^1$-p-chlorophenyl-$N^5$-isopropyl biguanide at a temperature below the decomposition temperature of the said biguanide.

5. Process for the preparation of $N^1$-p-chlorophenyl-$N^5$-isopropyl biguanide which comprises heating the p-chlorophenyl cyanamide salt of isopropyl guanidine in suspension in a non-polar organic liquid which is a non-solvent for the said salt but which is a solvent for the said $N^1$-p-chlorophenyl-$N^5$-isopropyl biguanide, at substantially the boiling point of said non-polar liquid but at a temperature below the decomposition temperature of the said biguanide.

6. Process for the preparation of $N^1$-p-chlorophenyl-$N^5$-isopropyl biguanide which comprises heating the p-chlorophenyl cyanamide salt of isopropyl guanidine in suspension in toluene, at the boiling point of toluene.

LEONCE EDOUARD BESSOT.
PIERRE GARET.

REFERENCES CITED

The following references are of record in the file of this patent:

FOREIGN PATENTS

| Number | Country | Date |
| --- | --- | --- |
| 62,539 | Argentina | Dec. 27, 1947 |
| 607,720 | Great Britain | Sept. 3, 1948 |

OTHER REFERENCES

Rathke, "Ber. deut. chem.," vol. 23 (1890), p. 1673.

Schotte et al., Hoppe Zeylers, "Zeit. Physiol. Chem.," vol. 174 (1928), pp. 174–176.

Slotta et al., "Ber. deut. chem.," vol. 62 (1929), pp. 1392–1395.